US011682786B2

(12) United States Patent
Ito (10) Patent No.: US 11,682,786 B2
(45) Date of Patent: Jun. 20, 2023

(54) FUEL CELL UNIT

(71) Applicant: TOYOTA JIDOSHA KABUSHIKI KAISHA, Toyota (JP)

(72) Inventor: Masayuki Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 17/530,610

(22) Filed: Nov. 19, 2021

(65) Prior Publication Data

US 2022/0173425 A1   Jun. 2, 2022

(30) Foreign Application Priority Data

Dec. 1, 2020   (JP) .............................. JP2020-199841

(51) Int. Cl.
*H01M 8/2475* (2016.01)
*H01M 8/0247* (2016.01)
*H01M 8/2465* (2016.01)

(52) U.S. Cl.
CPC ....... *H01M 8/2475* (2013.01); *H01M 8/0247* (2013.01); *H01M 8/2465* (2013.01)

(58) Field of Classification Search
CPC combination set(s) only.
See application file for complete search history.

(56) References Cited

U.S. PATENT DOCUMENTS

2019/0260058 A1\* 8/2019 Sumikawa .......... H01M 8/0488
2021/0043961 A1\* 2/2021 Itou .................... H01M 8/2475

FOREIGN PATENT DOCUMENTS

JP   2017073199 A   4/2017
JP   2019145413 A   8/2019

\* cited by examiner

*Primary Examiner* — Ula C Ruddock
*Assistant Examiner* — Sarika Gupta
(74) *Attorney, Agent, or Firm* — Dickinson Wright, PLLC (57) ABSTRACT

A fuel cell unit including: a stack case; stacked fuel cells; current collector plates; and tabs, wherein the power converter has a power converter case, and a power conversion component, wherein the bus bar is disposed in a slit provided on the stack case, wherein the bus bars each have a current collector plate connecting portion for connecting to the tabs at a first surface, a power conversion component connection portion connected to the power conversion component at a second surface, and a plurality of connecting portions for connecting the current collector plate connecting portion and the power conversion component connecting portion, and wherein the connecting portions each have a plate surface intersecting the plane belonging to the first surface and the plane belonging to the second surface.

4 Claims, 8 Drawing Sheets

FUEL CELL UNIT

FIELD

The present disclosure relates to a fuel cell unit.

BACKGROUND

The fuel cell unit includes a fuel cell stack and a power converter which include a stack case and a power converter case, respectively, with necessary members contained therein. As can be seen from FIG. 1 and FIG. 5 and the like, Patent Literature 1 discloses the structure of a housing where a stack case, an end plate and a power converter case are each coupled. In this housing, a fuel cell and a power conversion component are electrically connected by bus bars.

Patent Literature 2 discloses that a fuel cell housing case includes a stack case for accommodating a fuel cell stack and a boost converter; and a pair of stack bus bars disposed at both end portions in the stacking direction of the fuel cell stack; and further includes a first partition plate and a second partition plate partitioning the inside of the stack case into a space where the fuel cell stack is accommodated and a space where the boost converter is accommodated. The first partition plate and the second partition plate respectively have slits 14b and 15b into which the stack bus bars are inserted respectively, and overlapping portions 14a and 15a overlapping with each other.

CITATION LIST

Patent Literature

Patent Literature 1: JP-A-2017-073199
Patent Literature 2: JP-A-2019-145413

SUMMARY

Technical Problem

If the current output from the fuel cell is large, it is preferable to suppress the heat generation by increasing the cross-sectional area of the bus bar. To increase the cross-sectional area of the bus bar, it is necessary to increase at least one of the plate thickness and the plate width of the bus bar. However, the moldability of the bus bar is deteriorated when the plate thickness is increased; and it is necessary to widen the width of the opening (slit) of a wall of the stack case in order to increase the plate width. On the other hand, the wall of the stack case serves as a beam to hold the compressive load of the stack of the fuel cell. Therefore, if the width of the opening of the wall is widened, the function as a beam is lowered by the reduction of the strength of the wall, and it becomes difficult to hold the load properly.

In view of the above problems, it is an object of the present disclosure to provide a fuel cell unit capable of suppressing heat generation in a bus bar while maintaining the strength of a stack case.

Solution to Problem

The present application discloses a fuel cell unit having a fuel cell stack, a power converter, and bus bars for electrically connecting the fuel cell stack and the power converter, the fuel cell stack comprising: a stack case; stacked fuel cells comprising a plurality of stacked fuel cells that are plate-shaped as a whole, the stacked fuel cells being arranged inside the stack case; current collector plates disposed at both ends of the stacked fuel cells in a stacking direction of the fuel cells; and tabs which extends toward the power converter from the current collector plates, wherein the power converter has a power converter case coupled to the stack case, and a power conversion component disposed inside the power converter case, wherein part of the bus bar is disposed in a slit provided on a wall of the stack case, wherein the bus bars each have a current collector plate connecting portion for connecting to the tabs at a first surface, a power conversion component connection portion connected to the power conversion component at a second surface belonging to a plane that intersects a plane to which the first surface belongs, and a plurality of plate-shaped connecting portions for connecting the current collector plate connecting portion and the power conversion component connecting portion, and wherein the connecting portions each have a plate surface, at least part of the plate surface intersecting the plane belonging to the first surface and the plane belonging to the second surface.

The bus bars may each further comprise a connecting portion having a plate surface, at least part of the plate surface being parallel to the plane belonging to the first surface.

A bend portion may be included in the connecting portion.

Advantageous Effects

According to the fuel cell unit of the present disclosure, it is possible to reduce the electrical resistance by increasing the cross-sectional area for the current to pass through without increasing the plate thickness or width of the bus bar. Thus, without impairing the strength of the stack case, it is possible to suppress the heat generation from the bus bar even at a large current.

DETAILED DESCRIPTION OF EMBODIMENTS

1. Structure of Fuel Cell Unit

Figure 1:
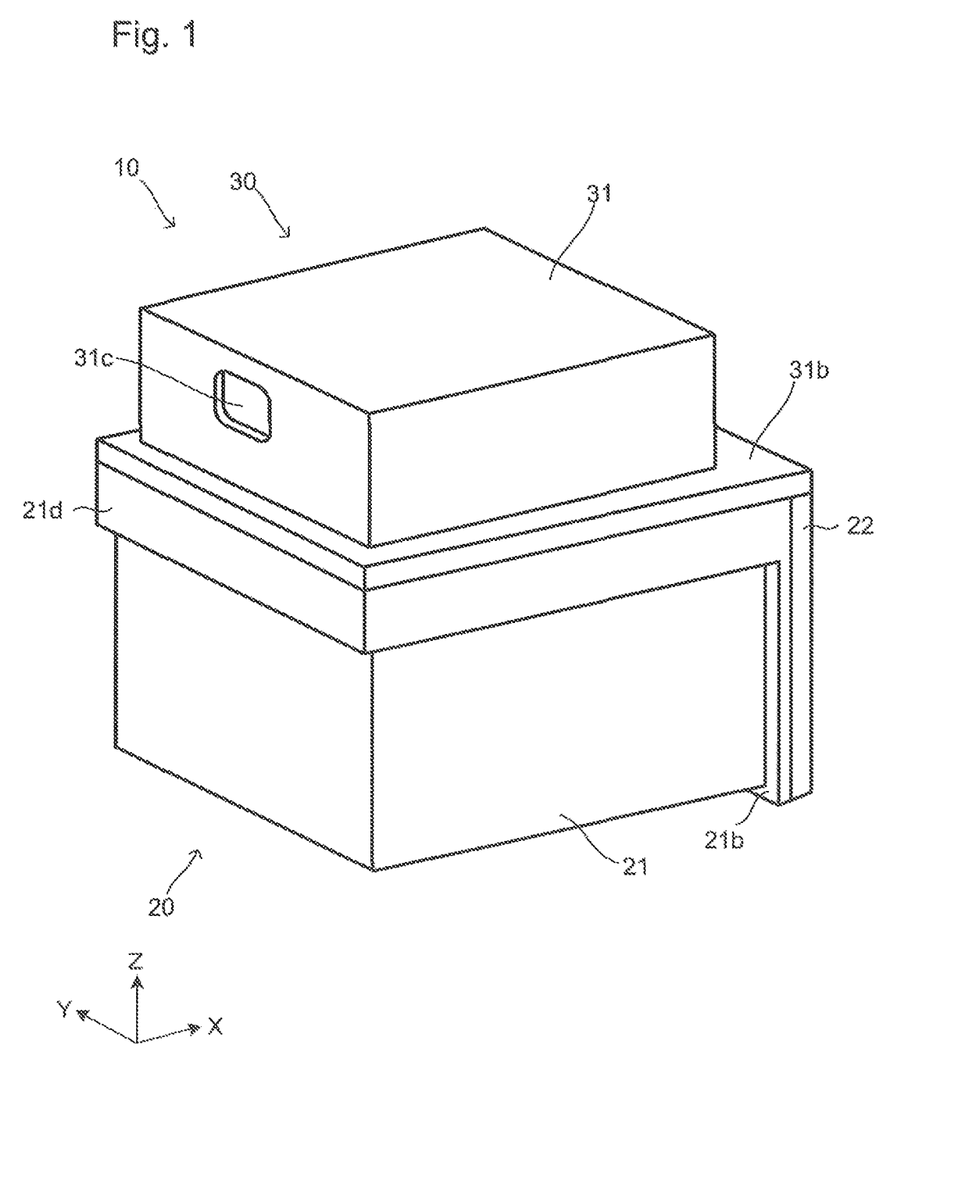
FIG. 1 is an external perspective view of a fuel cell unit according to an exemplary embodiment of the disclosure.
Figure 2:
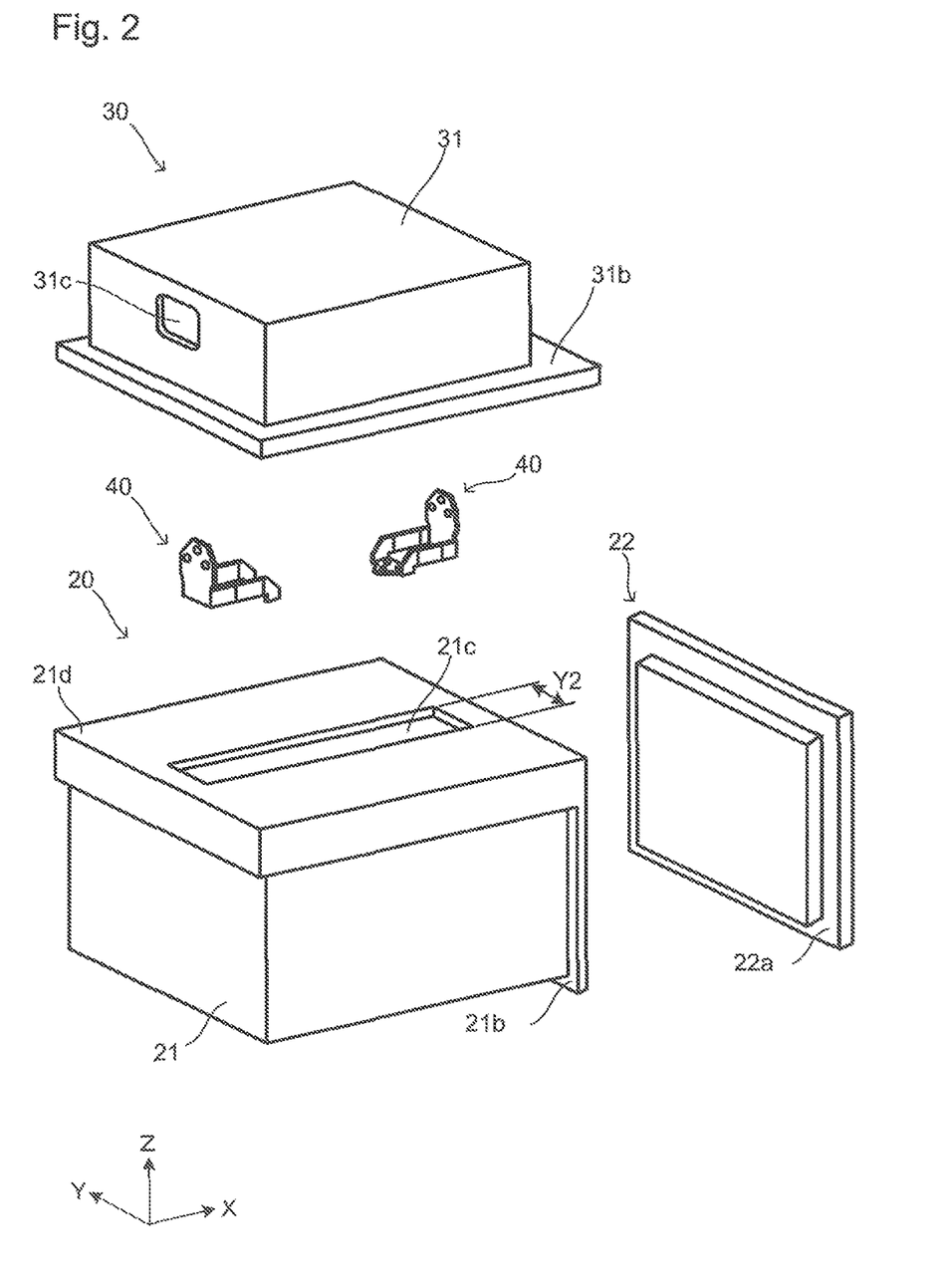
FIG. 2 is an exploded perspective view of the fuel cell unit of FIG. 1.
Figure 3:
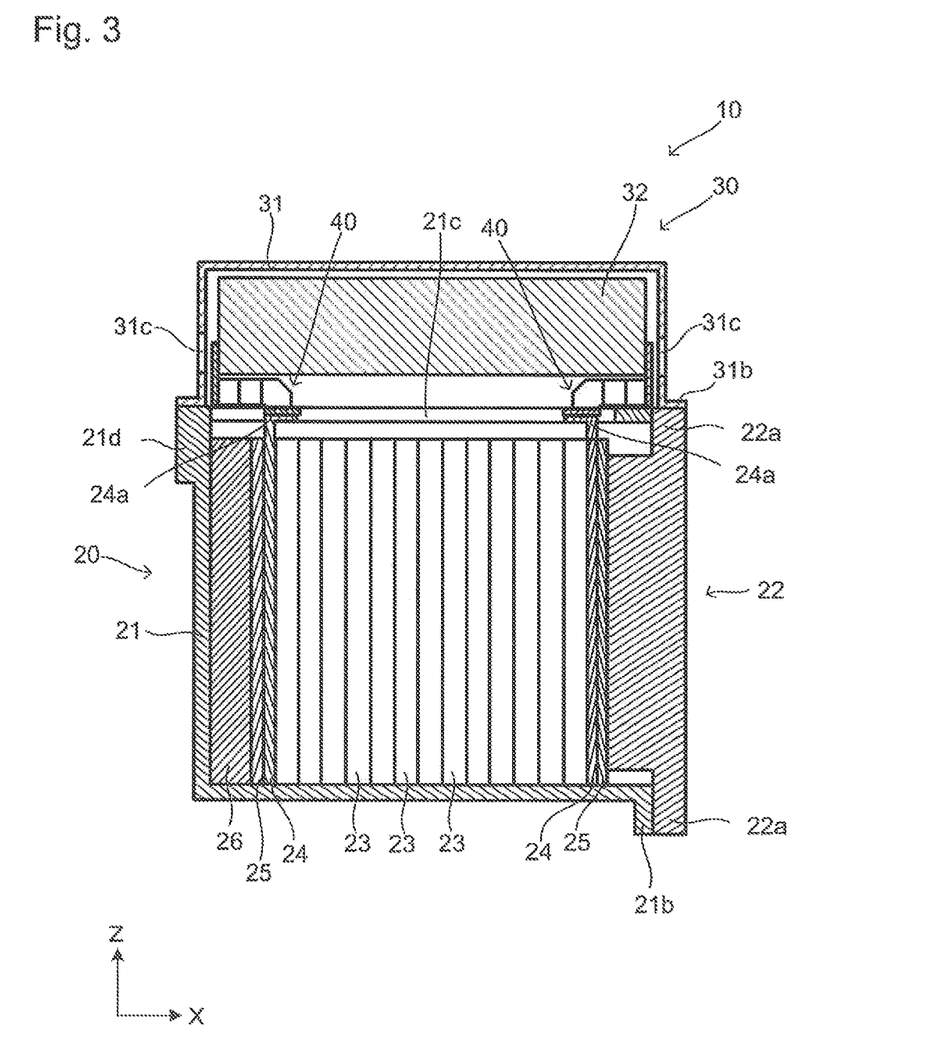
FIG. 3 is a cross-sectional view of the fuel cell unit of FIG. 1.
Figure 4:
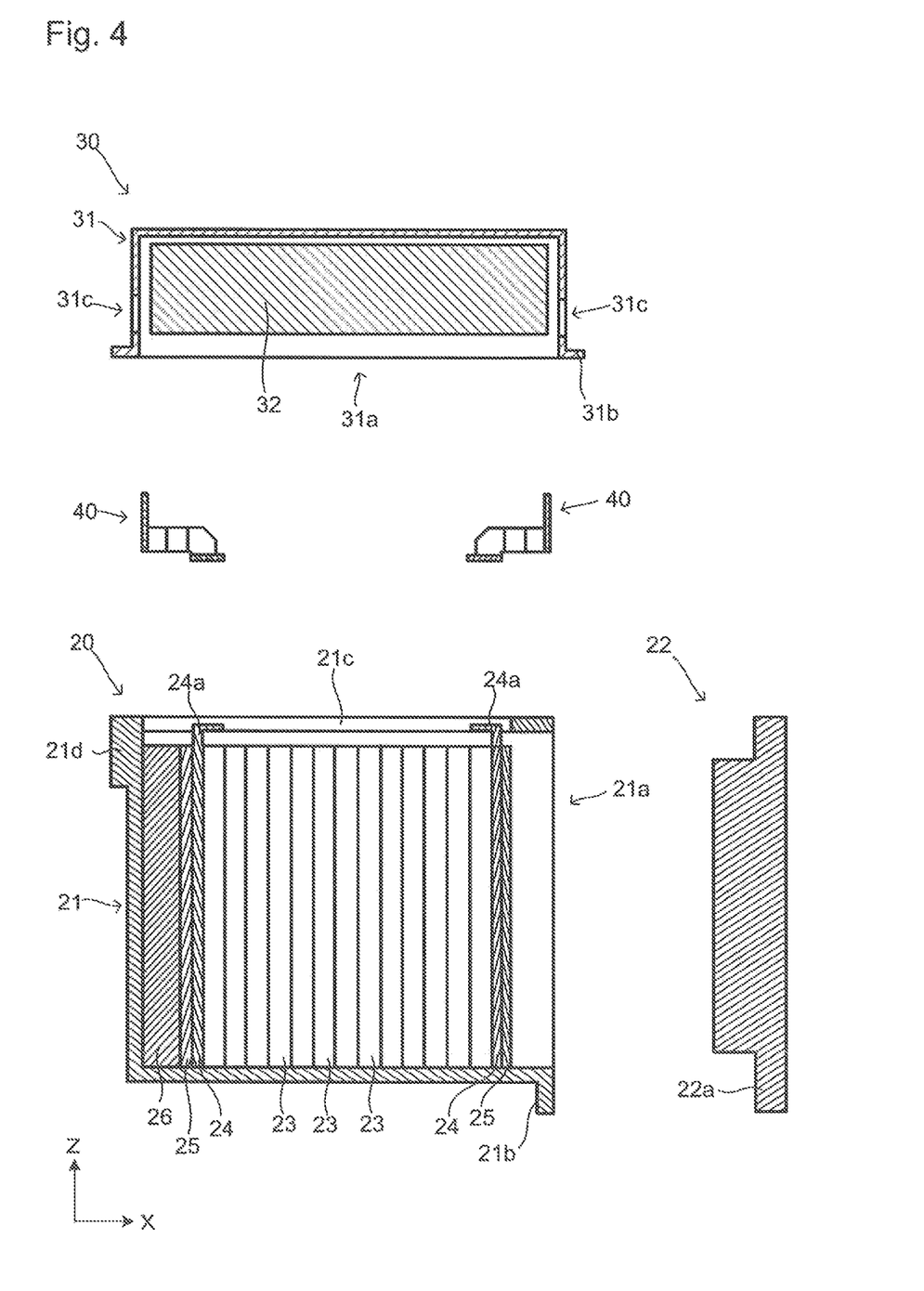
FIG. 4 is an exploded cross-sectional view of the fuel cell unit of FIG. 1.

FIGS. 1 to 4 show diagrams illustrating the fuel cell unit 10. FIG. 1 is an external perspective view of the fuel cell unit 10, FIG. 2 is an exploded perspective view of the fuel cell unit 10, FIG. 3 is a cross-sectional view of the fuel cell unit 10 (taken along a XZ plan cross-sectional view), and FIG. 4 is an exploded cross-sectional view of the fuel cell unit 10 (taken along a XZ plan cross-sectional view). In cross sectional FIGS. 3 and 4, hatching is not used on the cut surfaces of fuel cells 23 to increase legibility. In each drawing, the directions according to the three-dimensional Cartesian coordinate system (X, Y, Z coordinate system) are shown.

As can be seen from these drawings, the fuel cell unit 10 includes a fuel cell stack 20, a power converter 30, and bus bars 40. Each configuration will be described below.

1.1. Fuel Cell Stack

As can be seen from FIGS. 1 to 4, the fuel cell stack 20 includes a stack case 21, an end plate 22, the fuel cells 23, current collector plates 24, insulating sheets 25, and a biasing member 26.

[Stack Case]

The stack case 21 is a housing for housing a plurality of the superposed fuel cells 23, the current collector plates 24, the insulating sheets 25, and the biasing member 26 therein. The stack case 21 in this embodiment is a rectangular parallelepiped housing, without one wall, and having an opening 21*a*. The plate-shaped piece along the edge of the stack case 21 of the portion where the opening 21*a* is formed protrudes on the opposite side of the opening 21*a*, forming a flange 21*b*. The end plate 22 is coupled to the stack case 21 by the flange 21*b*.

Furthermore, of the stack case 21, a slit 21*c* is provided in the wall portion where the power converter 30 is disposed. The bus bars 40 are disposed in the slit 21*c* as will be described later, which results in electrical connection between the current collector plates 24 and a power conversion component 32 of the power converter 30.

Thus the slit 21*c* penetrates in the wall thickness direction (Z direction in this embodiment) so as to allow the inside and outside of the stack case 21 to communicate with each other. The slit 21*c* is elongated so as to extend in the direction in which the fuel cells 23 are stacked (X direction in this embodiment).

The width of the slit 21*c* (the size in the Y direction in this embodiment) has a size in which the bus bar 40 can be inserted, and is preferably 10% or more and 40% or less with respect to the width of the fuel cell 23 (the size in the Y direction in this embodiment). The width of the slit 21*c* narrower than this leads to the necessity for having a smaller bus bar, which may raise problems such as heat generation increasing due to increased electrical resistance. On the other hand, if the slit 21*c* is wider than this, there is a possibility that uniform surface pressure application to the stacked fuel cells 23 is difficult due to deflection of the fuel cells 23 at a position of the slit 21*c*.

The slit 21*c* along the edge of the stack case 21 of the wall provided therewith protrudes on the opposite side of the slit 21*c* to form a flange 21*d*. A power converter case 31 of the power converter 30 is coupled to the stack case 21 at the flange 21*d* by a bolt and the like.

From the viewpoint of having a function of protecting the fuel cell 23 from the outside, the stack case 21 has a predetermined strength, and is preferably made of metal having a thickness of about 2 mm or more and 5 mm or less.

[End Plate]

The end plate 22 is a plate-shaped member. Part of its outer peripheral end portion is provided so as to protrude, and forms a flange 22*a*.

The end plate 22 closes the opening 21*a* of the stack case 21. The flange 22*a* is disposed so as to superpose the flange 21*b* of the stack case 21. Then, for example, the end plate 22 is coupled to the stack case 21 so as to cover the opening 21*a* of the stack case 21 by a bolt, a nut, and the like disposed so as to penetrate the flange 21*b* and the flange 22*a*.

The end plate 22 thus functions as a lid for the stack case 21. It is preferable that the end plate 22 have high strength in order to suppress deflection of the fuel cells 23. Therefore, it is preferable that the end plate 22 be a metal, and the plate thickness thereof be equal to or greater than the thickness of the wall constituting the stack case 21, and the thickness of the flange 21*b*. The thickness of the end plate 22 is, for example, 10 mm or more and 30 mm or less.

[Fuel Cell]

The fuel cells 23 each include a membrane-electrode assembly (MEA) sandwiched between two separators, which is as known. MEA is a stack made of a solid polymer film, a negative electrode catalyst layer, a positive electrode catalyst layer, a negative electrode gas diffusion layer, a positive electrode gas diffusion layer, and the like. Then, in the fuel cell stack 20, a plurality of such fuel cells 23 are stacked to form stacked fuel cells.

Each of the fuel cells 23 is a plate shape as a whole. In this embodiment, the fuel cells 23 are disposed as the plate surfaces are along the YZ plane, and are superposed in the X direction.

[Current Collector Plates]

The current collector plates 24 are current collector plates for extracting power generated by the fuel cell, and are disposed on one side and the other side, respectively, in the stacking direction (X direction) of the fuel cells 23 with respect to the stacked fuel cells. The current collector plate 24 on the one side is a current collector plate of the + (plus) side, and the current collector plate 24 on the other side is a current collector plate of the − (minus) side. In this embodiment, the current collector plate 24 closer to the end plate 22 is a current collector plate of the − side, and the current collector plate 24 of the + side is disposed on the opposite side.

Tabs 24*a* extend from the current collector plates 24 toward the slit 21*e*, and are connected to the bus bars 40 as described later. as described above. As can be seen from FIG. 3 and FIG. 4, the tabs 24*a* in this embodiment are bent so that their tips are parallel to the XY plane.

The material and the form of the current collector plates are as known.

[Insulation Sheets]

The insulating sheets 25 are sheets for electrically insulating a stack by the stacked fuel cells and the current collector plates 24, and the stack case 21 and the end plate 22. The insulating sheets 25 are not particularly limited as long as being sheets having necessary insulating performance, and a known one can be used. Accordingly, the insulating sheets 25 are laminated on the side of the respective current collector plates 24, which is opposite to the side where the fuel cells 23 are disposed.

[Biasing Member]

The biasing member 26, a plurality of the fuel cells 23, the current collector plates 24, and the insulating sheets 25 are accommodated inside the stack case 21 together, to press a stack (stacked cells) by a plurality of the fuel cells 23, the current collector plates 24, and the insulating sheets 25 in the stacking direction (X direction), to apply a surface pressure to the fuel cells 23.

The form of the biasing member 26 is not particularly limited as long as the biasing member can impart a surface pressure to the fuel cells 23 as uniformly as possible, and examples thereof include a form in which a plurality of dish springs are arranged.

1.2. Power Converter

The power converter 30 is a device for converting power from the fuel cell stack 20, and examples thereof include a converter or inverter. A converter raises or lowers the output voltage of the fuel cell stack, and an inverter converts the electric power from the fuel cell stack from direct current to alternating current.

In this embodiment, the power converter 30 has the power converter case 31 and the power conversion component 32.

[Power Converter Case]

The power converter case 31 is a housing for housing the power conversion component 32, and the bus bars 40 thereinside. The power converter case 31 in this embodiment is a housing of a rectangular parallelepiped, without one wall, having an opening 31a. The plate-shaped piece along the edge of the power converter case 31 of the portion where the opening 31a is formed protrudes on the opposite side of the opening 31a, forming a flange 31b. The power converter 30 is coupled to the stack case 21 at the flange 31b by a bolt and the like.

Further, holes 31c are provided in the walls of the portions where the bus bars 40 are disposed in the power converter case 31. It is possible to connect the bus bars 40 to the terminals of the power conversion component 32, from the outside through the holes 31c.

Similarly to the stack case 21, the power converter case 31 preferably has a predetermined strength, and is preferably made of metal having a thickness of about 2 mm or more and 5 mm or less.

[Power Conversion Component]

The power conversion component 32 is a portion for converting power from the fuel cell stack 20, and is a member having a function as a converter or an inverter. Any known one may be used for the power conversion component 32.

1.3. Bus Bars

The bus bars 40 are members for electrically connecting the current collector plates 24 of the fuel cell stack 20, and the power conversion component 32 of the power converter 30. In this embodiment, the bus bars 40 of the same form are used for the respective two current collector plates 24. However, the present disclosure is not limited thereto, and the bus bar 40 in the present embodiment may be used only for one of them and a known bus bar may be used for the other. Although the bus bars 40 also appear in FIGS. 2 to 4, FIG. 5 shows a perspective view of the enlarged bus bar 40.

Figure 5:
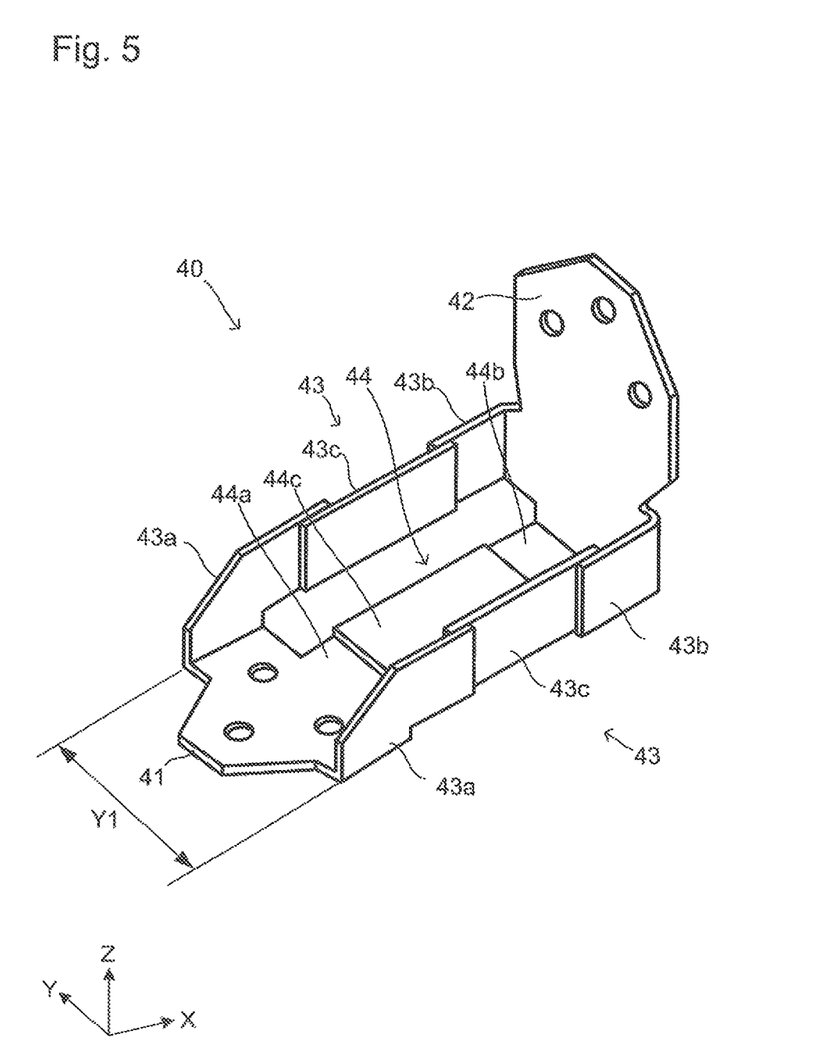
FIG. 5 is a perspective view of a bus bar according to an exemplary embodiment of the disclosure.

As can be seen from these drawings, the bus bars 40 each include a current collector plate connecting portion 41, a power conversion component connecting portion 42, first connecting portions 43, and a second connecting portion 44.

[Current Collector Plate Connecting Portion]

The current collector plate connecting portion 41 is a portion connected to the tab 24a of the current collector plate 24. The current collector plate connecting portion 41 is connected to the tab 24a at a first surface (XY plane in this embodiment). That is, the tip of each of the tabs 24a in this embodiment is formed so as to be parallel to the XY plane, and the current collector plate connecting portion 41 has a plate shape having a plate surface parallel to the XY plane so as to superpose the tab 24a.

[Power Conversion Component Connection Portion]

The power conversion component connecting portion 42 is a portion for connecting to any terminal (not shown) of the power conversion component 32. The power conversion component connecting portion 42 is connected to the power conversion component 32 on a surface belonging to a plane (YZ plane in this embodiment) intersecting the plane belonging to the first surface (XY plane in this embodiment).

Here, "plane belonging to" means a plane including a surface of interest.

In this embodiment, any terminal of the power conversion component 32 has a surface parallel to the YZ plane, and the power conversion component connecting portion 42 has a plate shape having a plate surface parallel to the YZ plane so as to superpose the terminal.

[Connecting Portion]

The connecting portions are plate-shaped portions for connecting and electrically conducting the current collector plate connecting portion 41 and the power conversion component connecting portion 42. In this embodiment, two types of the connecting portions of the first connecting portions 43 and the second connecting portion 44 are included.

In at least part of each of the first connecting portions 43, plate surfaces are flat faces (XZ plane in this embodiment) intersecting both the plane to which the first surface described above belongs (XY plane in this embodiment) and the plane to which the second surface belongs (YZ plane in this embodiment). Therefore, in the present embodiment, at least part of each of the first connecting portions 43 has a plate shape having a plate surface parallel to the XZ plane, and a plate thickness in the Y direction. Thus the size of the bus bar 40 in the Y direction (width direction) is suppressed while the cross-sectional area for electrically conducting the current collector plate connecting portion 41 and the power conversion component connecting portion 42 is enlarged.

Here, "plate surface" may be considered as usual, and is any surface other than the surfaces constituting the plate thickness in the plate-shaped member.

The first connecting portions 43 in this embodiment connect the Y-direction end portions of the current collector plate connecting portion 41 and the power conversion component connecting portion 42. Therefore, the two first connecting portions 43 in total are provided on the Y-direction end portions of the current collector plate connecting portion 41 and the power conversion component connecting portion 42, respectively, in this embodiment. The number of the first connecting portions 43 provided may be three or more from the viewpoint of suppressing heat generation by lowering the electrical resistance by ensuring a larger cross-sectional area.

In at least part of the second connecting portion 44, a plate surface is a surface (XY plane in this embodiment) parallel to the plane to which the first surface described above belongs.

In the present embodiment, the second connecting portion 44 has a plate shape having a plate surface parallel to the XY plane, and a plate thickness in the Z direction. That is, the second connecting portion 44 is such that the plane to which the plate surface of the second connecting portion 44 belongs is substantially the same as or parallel to the plane to which the plate surface of the current collector plate connecting portion 41 belongs, and such as to have a plate surface intersecting the plane to which the plate surface of the power conversion component connecting portion 42 belongs, and have a plate thickness in the Z direction.

[Production of Bus Bars Etc.]

The first connecting portions 43 and the second connecting portion 44 in this embodiment have first portions 43a and 44a connected to the current collector plate connecting portion 41, second portions 43b and 44b connected to the power conversion component connecting portion 42, and third portions 43c and 44c connecting the first portions 43a and 44a and the second portions 43b and 44b. With such a structure, the current collector plate connecting portion 41 and the first portion 43a are manufactured by bending, the power conversion component connecting portion 42 and the second portions 43b and 44b are manufactured by bending, and two kinds of those portions are jointed by the third portions 43c and 44c, which make it possible to produce the bus bar 40. This makes it possible to produce the bus bars 40 easily with simple bending and joining.

However, the present disclosure is not limited to the foregoing. The bus bars 40 may be integrally formed without any joint portion by press molding from one plate, for example, by deep drawing or the like. The connecting portions may be integrally joined to the current collector plate connecting portion 41 and the power conversion component connecting portion 42 without being divided into the first, second and third portions.

The plate thickness of each portion constituting the bus bars 40 is not particularly limited and can be appropriately determined in view of the magnitude of the current flowing, but can be about 1 mm or more and 5 mm or less. Further, although there is no particular limitation on the material of each portion constituting the bus bars 40, it is preferable that the material be a material having a small electric resistance due to its properties, and for example, copper, a copper alloy, aluminum, an aluminum alloy, or the like can be used.

1.4. Combination of Members Constituting Fuel Cell Unit

The fuel cell stack 20, the power converter 30, and the bus bars 40 as described above are combined as shown in FIGS. 1 to 4 to form the fuel cell unit 10.

A plurality of the fuel cells 23 are superposed in the X direction to form stacked fuel cells. The current collector plates 24 are each disposed at either end of the fuel cells 23 in the stacking direction in the stacked fuel cells (X direction). Further, the insulating sheets 25 are superposed on the respective outsides of the current collector plates 24. Thus, the stack fuel cells, the current collector plates 24, and the insulating sheets 25 form a stack (stacked cells).

The biasing member 26 is superposed on one face of the stacked cells in the stacking direction (X direction). Then, the stack that is the stacked cells where the biasing member 26 is superposed is housed inside the stack case 21. At this time, the biasing member 26 is opposite to the opening 21a of the stack case 21, and the side opposite to the side where the biasing member 26 is stacked is the opening 21a side of the stack case 21. Further, the tabs 24a of the current collector plates 24 are disposed so as to extend toward the slit 21c of the stack case 21 (power converter 30).

The end plate 22 closes the opening 21a of the stack case 21, and the flange 21b of the stack case 21 is disposed so as to superpose the flange 22a of the end plate 22. Then, for example, the end plate 22 is coupled to the stack case 21 so as to cover the opening 21a of the stack case 21 by a bolt, a nut, and the like disposed so as to penetrate the flange 21b and the flange 22a. At this time, the end plate 22 is disposed so as to contact a surface of the cell stack. In a posture in which the end plate 22 is disposed for the stack case 21, the biasing member 26 presses the stacked cells, gives a biasing force to the stacked cells, so that the surface pressure is applied to the fuel cells 23. This biasing force has only to be applied when the end plate 22 is attached to the stack case 21 (coupled by a bolt, a nut, and the like).

The current collector plate connecting portions 41 of the bus bars 40 are inserted into the inside of the slit 21c of the stack case 21, so that the bus bars 40 are superposed on the tabs 24a of the current collector plates 24. As described above, both share the first surface (in this embodiment, a surface parallel to the XY plane) so as to be superposed on the surface, and both are coupled by a bolt and the like. Thus the power conversion component connecting portions 42 of the bus bars 40 are arranged so as to rise from the stack case 21, and the plate surface thereof is the second surface (in this embodiment, a surface parallel to the YZ plane). Thus the plate surfaces of the first connecting portions 43 of the bus bars 40 are disposed so as to intersect the plane to which the first surface belongs (XY plane) and the plane to which the second surface belongs (YZ plane). In this embodiment, the plate surface is parallel to the XZ plane, and the Y direction is the plate thickness direction.

The power converter 30 is superposed on the surface of the stack case 21 where the slit 21c is provided, in a state where the power conversion component 32 is disposed inside the power converter case 31. At this time, the opening 31a of the power converter case 31 is directed to the stack case 21 side, and the flange 31b of the power converter case 31 is disposed so as to superpose the flange 21d of the stack case 21. Thus the opening 31a of the power converter case 31 is closed by the stack case 21. Then, for example, the flange 21d and the flange 31b are connected by a bolt and the like, and the power converter 30 is fixed to the stack case 21.

The power conversion component connecting portions 42 of the bus bars 40 are superposed on the terminals of the power conversion component 32. As described above, both share the second surface (in this embodiment, a surface parallel to the YZ plane) so as to be superposed on the surface, and both are coupled by a bolt and the like. This coupling can be done through the holes 31c. Thus the current collector plates 24 and the power conversion component 32 are electrically connected. The holes 31c are sealed by a cover (not shown).

2. Effects Etc.

The fuel cell unit 10 of the present disclosure is mounted on a vehicle such that the Z direction is the vertical direction. That is, the fuel cell unit 10 is arranged so that the stacking direction of the fuel cells 23 are substantially horizontal. However, the orientation of the fuel cell unit 10 is not particularly limited.

Figure 6:
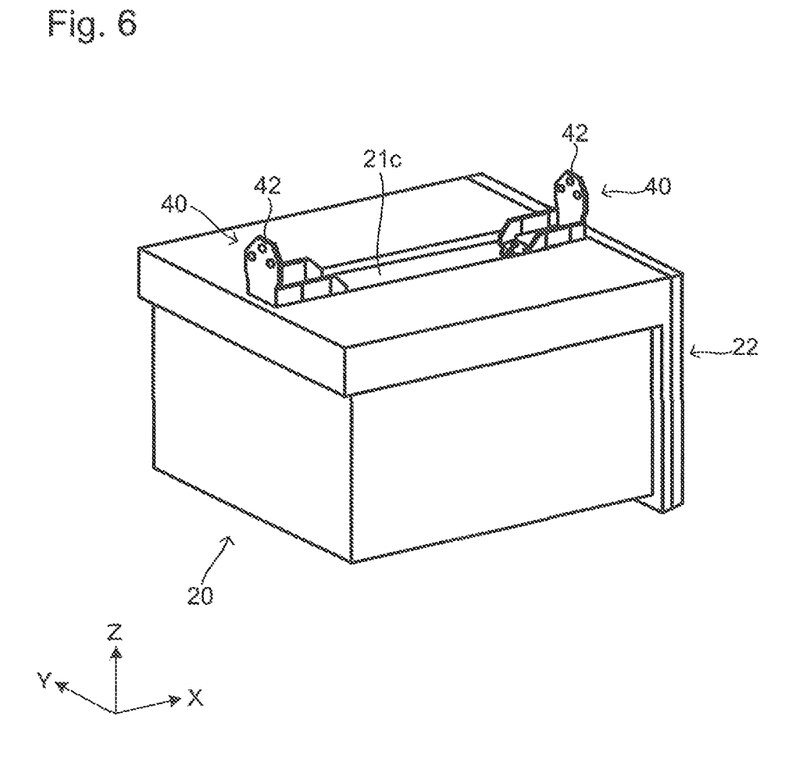
FIG. 6 is a diagram illustrating the arrangement of the bus bars of FIG. 5.

FIG. 6 shows a perspective view of the fuel cell unit 10 for illustrative purposes. However, the illustration of the power converter 30 is omitted in FIG. 6 for clarity.

According to the fuel cell unit 10 of the present disclosure, the bus bars 40 are each provided with a plurality of the first connecting portions 43. Thus, as compared with the case where the current collector plate connecting portions 41 and the power conversion component connecting portions 42 are connected only by the second connecting portions 44, a plurality of the first connecting portions 43 are disposed, so that the cross-sectional area for conducting the current collector plate connecting portions 41 and the power conversion component connecting portions 42 increases, which makes it possible to reduce the electrical resistance, and to suppress the heat generation.

The width of each of the bus bars 40 shown by Y1 in FIG. 5 despite thus increasing the cross-sectional area and lowering the electrical resistance is hardly changed as compared with the bus bars only by the second connecting portions 44. Therefore, it is possible to reduce the electrical resistance of the bus bars 40 without increasing the width of the slit 21c shown by Y2 in FIG. 2. Thus, less distortion of the fuel cells 23 because the strength of the stack case 21 does not decrease makes it possible to maintain the height of the uniformity of the surface pressure applied to the fuel cells 23.

Further, workability is enhanced because it is not necessary to increase the thickness of each portion constituting the bus bars. Such a configuration is excellent in productivity.

Incidentally, three-dimensional Cartesian coordinate system (X, Y, Z) was used from the viewpoint of explanation and easy understanding. And the example such that the orientation and relationship of each member (e.g., first surface, second surface, plate thickness, etc.) matched the axis (X, Y, Z) and plane (XY plane, XZ plane, YZ plane) of the coordinate system. However, the orientation and relationship of each member need not be exact, and may have an angle with respect to X, Y, Z, XY plane, XZ plane, and YZ plane. In short, in the bus bar, it is sufficient to reduce the electrical resistance by increasing the cross-sectional area by providing the first connecting portion connecting the current collector plate connecting portion and the power conversion component connecting portion without greatly changing the width of the bus bar and the plate thickness of the member constituting the bus bar.

3. Modifications 3.1. First Modification

Figure 7:
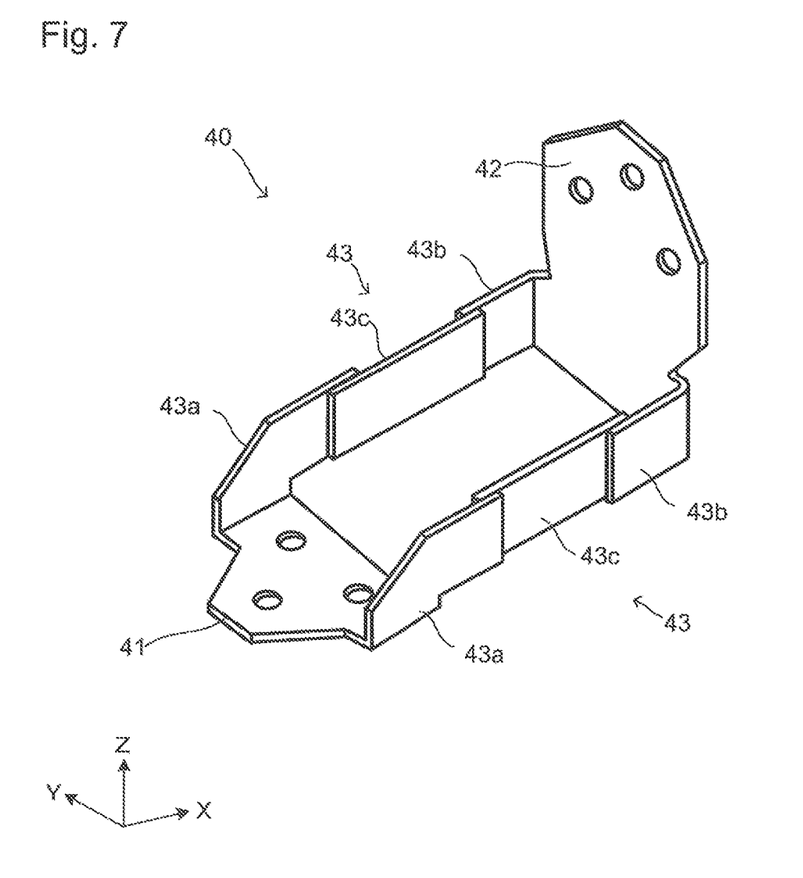
FIG. 7 is a perspective view of a bus bar according to a first modification.

FIG. 7 shows an example in which the second connecting portion 44 is not included but only the two first connecting portions 43 are included in the above-described bus bar. This also provides the same effect as described above. On the other hand, the three or more first connecting portions 43 may be provided from the viewpoint of further reducing the electric resistance.

3.2. Second Modification

Figure 8:
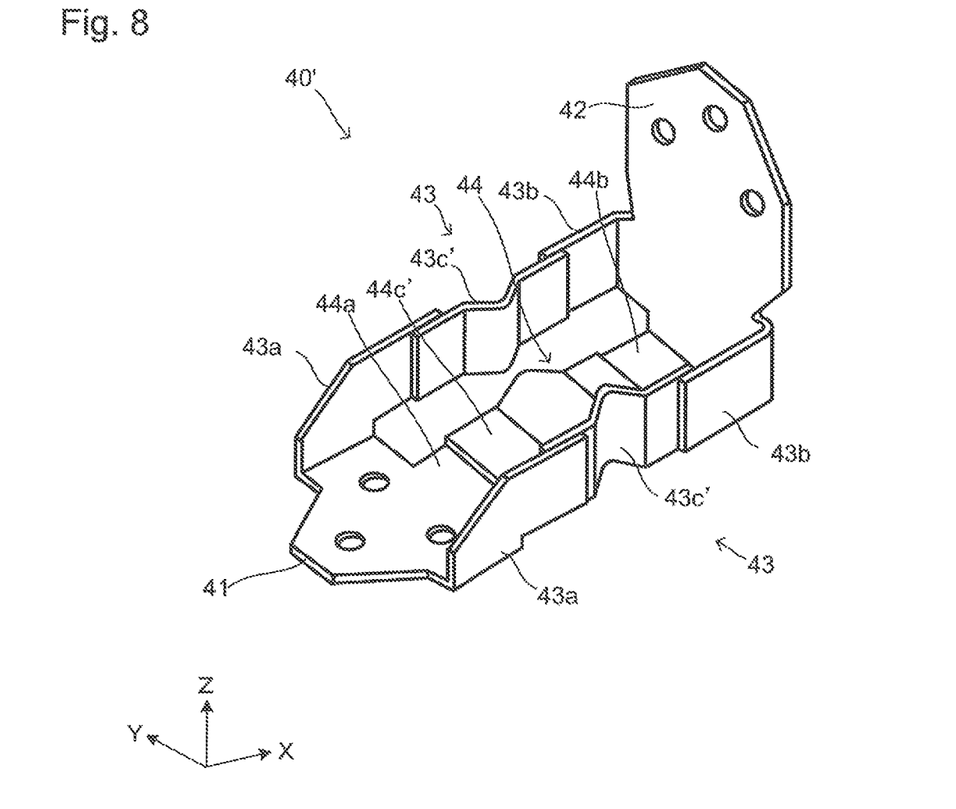
FIG. 8 is a perspective view of a bus bar according to a second modification.

FIG. 8 shows a perspective view of a bus bar 40' included in the fuel cell unit of the second modification. In the bus bar 40', third portions 43c', 44c' are applied instead of the third portions 43c, 44c of each of the bus bars 40 described above. Other portions can be considered in the same manner as the bus bars 40 and thus is denoted by the same reference numerals, and description thereof will be omitted.

The third portions 43c, 44c described above are plate-shaped such that the plate surfaces thereof extend straight toward the power conversion component connecting portion 42 from the current collector plate connecting portion 41. The third portions 43c', 44c' each have a form having a bent portion such that part thereof protrudes in the thickness direction. It is preferable that the protrusion of the member by the bent portion be in a direction such that the width of the bus bar does not widen. Accordingly, it is preferable that the bending portions included in the two first connecting portions 43 be opposed to each other in its protruding direction.

When the biasing member 26 is disposed in the fuel cell stack 21 as in this embodiment, thereby pressing the fuel cells 23, the thickness of the fuel cells 23 varies depending on the operating conditions such as humidity and temperature, and during operation of the fuel cell unit, any of the current collector plates 24 may move in the X direction (stacking direction of the fuel cells). The bus bar 40' provided with the third portions 43c', 44c' easily follow such a movement of the current collector plate(s) 24 in the stacking direction of the fuel cells, and it is possible to reduce the load on the current collector connecting portion and the power conversion component connecting portion.

REFERENCE SIGNS LIST

10 Fuel cells unit
20 Fuel cell stack
21 Stack case
22 End plate
23 Fuel cell
24 Current collector plate
25 Insulating sheet
26 Biasing member
30 Power converter
31 Power converter case
32 Power conversion component
40 Bus bar
41 Current collector plate connection portion
42 Power conversion component connection portion
43 First connection portion
44 Second connection portion

What is claimed is:

1. A fuel cell unit having a fuel cell stack, a power converter, and bus bars for electrically connecting the fuel cell stack and the power converter, the fuel cell stack comprising:
    a stack case;
    stacked fuel cells comprising a plurality of stacked fuel cells that are plate-shaped as a whole, the stacked fuel cells being arranged inside the stack case;
    current collector plates disposed at both ends of the stacked fuel cells in a stacking direction of the fuel cells; and
    tabs which extends toward the power converter from the current collector plates,
    wherein the power converter has a power converter case coupled to the stack case, and a power conversion component disposed inside the power converter case,
    wherein part of the bus bar is disposed in a slit provided on a wall of the stack case,
    wherein the bus bars each have a current collector plate connecting portion for connecting to the tabs at a first surface, a power conversion component connection portion connected to the power conversion component at a second surface belonging to a plane that intersects a plane to which the first surface belongs, and a plurality of plate-shaped connecting portions for connecting the current collector plate connecting portion and the power conversion component connecting portion, and
    wherein the connecting portions each have a plate surface, at least part of the plate surface intersecting the plane belonging to the first surface and the plane belonging to the second surface.

2. The fuel cell unit according to claim 1, wherein the bus bars each further comprise a connecting portion having a plate surface, at least part of the plate surface being parallel to the plane belonging to the first surface.

3. The fuel cell unit according to claim 1, wherein a bend portion is included in the connecting portion.

4. The fuel cell unit according to claim 2, wherein a bend portion is provided in the connecting portion.

* * * * *